Dec. 24, 1963 W. KOPP 3,115,080
AUTOMATIC SHUTTER
Filed Nov. 22, 1961 2 Sheets-Sheet 1

INVENTOR
Wilhelm Kopp
by:
Michael S. Striker
Attorney

Dec. 24, 1963  W. KOPP  3,115,080
AUTOMATIC SHUTTER

Filed Nov. 22, 1961  2 Sheets-Sheet 2

INVENTOR
Wilhelm Kopp
by:
Michael S. Striker
R Kern

United States Patent Office 3,115,080
Patented Dec. 24, 1963

3,115,080
AUTOMATIC SHUTTER
Wilhelm Kopp, Wiesbaden-Sonnenberg, Germany, assignor to Adox-Fotowerke Dr. C. Schleussner G.m.b.H. Kamerawerk, Wiesbaden-Biebrich, Germany
Filed Nov. 22, 1961, Ser. No. 154,133
Claims priority, application Germany Nov. 26, 1960
7 Claims. (Cl. 95—53)

The present invention relates to cameras.

More particularly, the present invention relates to structures for operating the shutters of cameras. The present invention is particularly adapted for that type of camera operating structures where the operator moves a shutter operating element which during movement from a given starting to a given end position will first cock and then release the shutter.

With shutter operating structures of this type as now known, there is a basic defect which so far has not been satisfactorily eliminated. This defect resides in the fact that the structure which drives the shutter from its closed to its open position is necessarily in its operative position ready to drive the shutter before the element which is moved by the operator in order to cock and release the shutter reaches its end position. The result is that if the operator decides not to make the exposure and releases the shutter operating member which he moves before this member reaches its end position but after it has placed the shutter driving structure in its operative position ready to drive the shutter, an exposure will nevertheless be made against the will of the operator. While it may be possible in theory to provide a structure where the shutter driving elements do not reach their position where they are capable of driving the shutter until the precise moment when the element moved by the operator reaches its end position, in practice this precision cannot be maintained. Allowance must be made for wear of the parts, as well as for necessary lack of absolute perfection in their manufacture and therefore as a practical necessity in order to provide reliable shutter operation it is essential with structures of this type that the shutter driving elements reach their operative position ready to drive the shuter before the element which is actuated by the operator reaches its end position, and since this relationship is essential for the above reasons the above-discussed defect is necessarily inherent in this structure.

It is accordingly a primary object of the present invention to provide a structure of the above type which will reliably prevent the shutter from being opened until the shutter operating member which is moved by the operator reaches its end position. Thus, with the structure of the invention if the operator should decide not to make an exposure at any time before the manually operable shutter operating member has moved through its full distance all the way to the end of its movement, an exposure will not be made and the above-discussed defects will be reliably eliminated.

Another object of the present invention is to provide a structure of the above type where the shutter driving elements will in fact reach their position ready to drive the shutter from its closed to its open position before the manually operable shutter control element has been moved by the operator all the way to its end position but which nevertheless will prevent the shutter driving elements from driving the shutter from its closed to its open position until the shutter operating element has been moved by the operator all the way to its end position.

A further object of the present invention is to provide a structure of the above type which requires almost no changes in a conventional structure of the above type and requires only the addition of a single simple unit to the conventional structure in order to overcome the above-discussed defect.

In this way it does not become necessary to redesign the conventional shutter structure and the space required by the entire shutter operating assembly is increased only to a small extent inasmuch as this single unit of the invention requires very little additional space.

It is furthermore an object of the present invention to provide a unit of the type mentioned in the preceding paragraph which will operate in a fully automatic manner without any awareness on the part of the operator that such a unit is even present in the camera, so that the camera will be operated in exactly the same way as a conventional camera with the one difference that if the operator should change his mind and decide not to make an exposure, an exposure will in fact not be made even if the operator has moved the shutter actuating member through a distance sufficient to place the shutter driving structure in a position where it is capable of driving the shutter.

With these objects in view, the invention includes, in a camera, a support means and a shutter means carried by the support means for movement between a closed position and an open position in order to make an exposure, the shutter means normally remaining in its closed position. A shutter drive means is carried by the support means for driving the shutter means from its closed to its open position, and this shutter drive means is movably supported on the support means for movement between an inoperative position where the shutter drive means is incapable of driving the shutter and an operative position where the shutter drive means is capable of driving the shutter from its closed to its open position. A manually operable means is accessible to the operator and is movably carried by the support means, this manually operable means being movable by the operator from a given starting position all the way to a given end position, and during this latter movement the manually operable means engages the shutter drive means and moves it from its inoperative to its operative position, and the manually operable means places the shutter drive means in its operative position just before the manually operable means has reached its end position, so that if the operator were to release the manually operable means just before it reaches its end position but after it has placed the shutter drive means in its operative position, an exposure might be made against the will of the operator. In accordance with the present invention a holding means is carried by the support means and engages the shutter drive means when it has reached its operating position and releasably holds the shutter drive means in operating position until the operator has moved the manually operable means all the way to its end position, so that if the operator should decide not to make the exposure and should release the manually operable means under the above conditions where the drive means has been placed in operating position but the manually operable means has not reached its end position, an exposure will not be made, so that in this way unintentional exposures are reliably prevented with the structure of the invention.

The novel features which are considered as characteristics for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
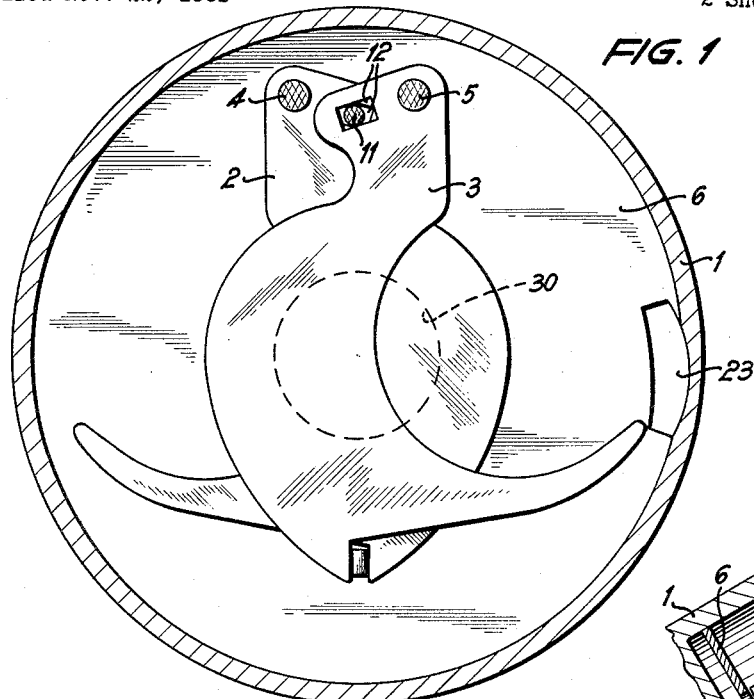
FIG. 1 shows in a plane normal to the optical axis of the objective of a camera one form of shutter construction capable of being controlled with the structure of the invention.

Referring now to the drawings, the shutter illustrated therein is a between-the-lens type of shutter which forms part of the objective assembly of the camera. The outer wall 1 of the shutter housing is shown in the drawings, and this wall 1 forms together iwth a transverse annular wall 6, which surrounds the optical axis, a supoprt means for the structure of the invention. The wall 6 is located just in front of the structure shown in the FIG. 1 parallel to the plane of the latter, and this wall 6 carries the pair of pivot pins 4 and 5 which extend parallel the optical axis. The pivot pin 4 supports for rotary movement the shutter blade 2 shown in FIG. 1, while the pivot pin 5 supports for rotary movement the shutter blade 3 shown in FIG. 1, and these shutter blades are identical but oppositely directed, as is apparent from FIG. 1. In their overlapping position indicated in FIG. 1, they extend completely across the opening of the objective through which an exposure is made and thus the shutter is shown in FIG. 1 in its closed position. The shutter means shown in FIG. 1 further includes a pin 11 which extends through a pair of intersecting slots 12 respectively formed in the shutter blades 2 and 3. In a manner described below, this pin 11, during driving of the shutter means, turns in a counterclockwise direction, as viewed in FIG. 1, about the pivot pin 4, so that by cooperation of the pin 11 with the upper edges of the slots 12 the shutter blades 2 and 3 are simulaneously turned in opposite directions in order to make an exposure, the blade 2 turning in a counterclockwise direction and the blade 3 turning in a clockwise direction, as viewed in FIG. 1, during movement of the shutter means from its closed position shown in FIG. 1 to its open position in order to make an exposure.

Figure 5:
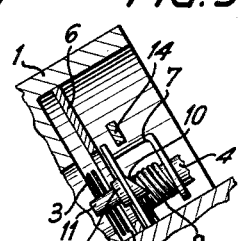
FIG. 5 is a fragmentary sectional view taken along line 5—5 of FIG. 2 in the direction of the arrows.
Figure 2:
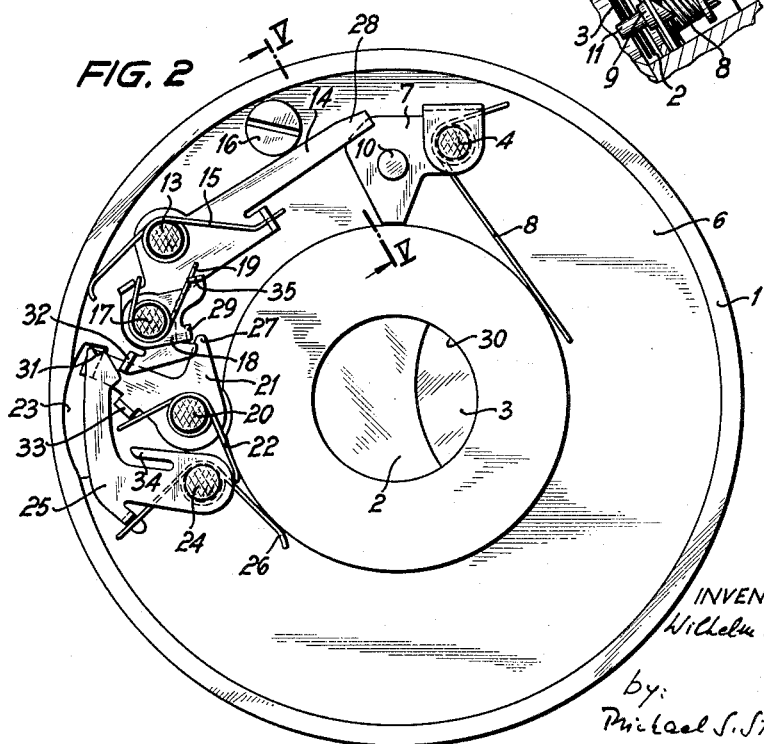
FIG. 2 shows the shutter controling structure in a plane normal to the optical axis and different from that of FIG. 1, the parts being shown in FIG. 2 in their rest positions.

The plate 6 is shown in FIG. 2 surrounding an inner tubular part of the stationary supporting structure which carries the lenses of the objective and which defines the opening 30 through which light reaches the film, and as may be seen from FIG. 2 the shutter blades 2 and 3 completely close the passage 30 of the objective. The pivot pin 4 extends through and beyond the plate 6 of the support means and pivotally supports at the side of the plate 6 opposie from the shutter blades a lever 7 which also forms part of the shutter means. As is apparent from FIG. 5, the lever 7 has a substantially U-shaped portion formed with aligned openings receiving the pivot pin 4, and a spring 8 is coiled about the pin 4, presses with one leg against the stationary lens supporting structure, and presses with its other leg against the transverse wall of the U-shaped portion of the lever 7 so as to urge this lever 7 to turn in a counter clockwise direction, as viewed in FIG. 2. The lever 7 is limited in its turning by the spring 8 by engagement of the lower end of the lever 7, view in FIG. 2, with the exterior surface of the stationary inner tubular support for the objective. The lever 7 fixedly carries an elongated pin 9 which extends parallel to the optical axis and which has a reduced free end portion forming the pin 11 which actuates the shutter blades 2 and 3 in the manner described above, as may be seen from FIG. 5. Of course, the plate 6 is formed with a suitable opening to provide for the necessary free turning movement of the pin 9 and its extension 11 in order to actuate the shutter blades. The end face 10 of the pin 9, this end face 10 being visible in FIGS. 2 and 5, is inclined in the manner shown most clearly in FIG. 5, and the inclination is such that the bottom most part of the face 10 is near to the viewed of FIG. 2 than its uppermost part.

The above-described elements, with the exception of the support means 1, 6, forms the shutter means which is adapted to be driven from the closed position shown in the drawings to an open position where the exposure will be made. A shutter drive means is provided for driving this shutter means from its closed to its open position, and this shutter drive means includes the shutter driving lever 14 which is turnably carried by a pivot pin 13 which is in turn carried by the plate 6, this pin 13 also extending parallel to the optical axis. A spring 15 is coiled about the pin 13, engages with one end against an inner surface of the outer tube 1 of the shutter housing, and engages with its opposite end against a lug of the lever 14 so as to urge the latter to turn in a counter clockwise direction, as viewed in FIG. 5, a head of a screw 16, which is carried by the wall 6, forming a stop which engages the lever 14 to limit the turning movement thereof by the spring 15, this spring of course having a certain pretension when the parts are in the rest position as shown in FIG. 2. The shutter drive lever means 14 is shown in FIG. 2 in its inoperative position where it is incapable of driving the shutter means. As is apparent from FIG. 2, the lever means 14 has a relatively long arm engaging the stop 16, and this arm is also springy. The inclined face 10 of the pin 9 is located in the path of movement of the springy free end portion 28 of the lever 14, so that when this lever 14 is turned in a clockwise direction, as viewed in FIG. 2, about the pivot pin 13 in opposition to the spring 15, the springy free end portion 28 of the lever 14 will ride along the inclined face 10 of pin 9 and will then snap beneath the pin 9 to engage the underside thereof, and then upon release of the shutter drive means 14, whose spring 15 has been further tensioned during movement of the shutter drive means 14 from its inoperative position shown in FIG. 2 to its operative position where it engages beneath the pin 9, this shutter drive means will turn the lever 7 in opposition to spring 8 through an angle sufficient to displace the shutter blades 2 and 3 respectively through angles great enough to provide an exposure of the film, and during this turning of the lever 7 through the lever 14 the lever 14 simply rides off the pin 9 during return of the lever 14 to its rest position by the spring 15 so that after the end 28 of the lever 14 has moved beyond the pin 9 the spring 8 is released to return the shutter to its closed position.

The shutter drive lever means includes in addition to the lever 14 itself a pin 17 carried by the lever 14 for rotary movement therewith about the pin 13 and an additional lever 18 which is turnable on the pin 17. The lever 18 has a lug 35 at its upper right end portion, as viewed in FIG. 2, engaged by one leg of a spring 19 which is coiled around the pin 17, the other leg of this spring engaging a lug of the lever 14, so that in this way the spring 19 urges the lever 18 to turn into a clockwise direction around the pin 17, as viewed in FIG. 2. At its lower right end portion, as viewed in FIG. 2, the lever 18 has a lug 29 extending away from the viewer of FIG. 2 toward the wall 6, and this lug 29 engages a projection located at the lower right end of the lever 14, as viewed in FIG. 2. The lever 14 includes in addition, at its lower left end, as viewed in FIG. 2, a lug 32 extending toward the viewer of FIG. 2 away from the plate 6.

A manually operable lever means 21 is capable of being actuated by the operator for moving the shutter drive lever means 14 from its rest position shown in FIG. 2, where the shutter drive lever means 14 is inoperative, to its operative position where the end 28 engages beneath the pin 9. This manually operable lever 21 is supported for rotary movement by a pin 20 which is carried by the plate 6 and which extends parallel to the optical axis, and at its left end, as viewed in FIG. 2, the lever 21 includes an extension extending through the opening 23 of the plate 6 to a location where either a further extension of the lever 21 or a motion transmitting structure cooperating therewith is accessible to the operator in order to enable the operator to turn the lever 21 in a counter clockwise direction, as viewed in FIG. 2, from its starting position shown in FIG. 2. This starting position may be determined, for example, by engagement of the left end of the lever 21, as viewed in FIG. 2, with the upper edge of the opening 23. It will be noted that the plane of the lever 21 is situated behind the plane of the lever 14, as viewed in FIG. 2. In other words the lever 21 is located nearer to the plate 6 than the lever 14, and the projection 29 of the lever 18 extends through the plane in which the lever 21 turns. A spring 22 is coiled around the pin 20, has one leg engaging the stationary inner tube of the assembly, and has an opposite leg engaging a lug 33 of the lever 21, this lug extending away from the plate 6, and in this way the spring 22 urges the lever 21 to its starting position shown in FIG. 2.

The invention will be best understood by recognizing what takes place with the operation of the structure thus far described, assuming that there were no additional structure included. Thus, under these conditions if the operator turns the manually operable lever means 21 in a counter clockwise direction, as viewed in FIG. 2, in opposition to the spring 22, the end 27 of the lever 21 by engagement with the projection 29 of the lever 18 would turn the lever 14 in a clockwise direction, as viewed in FIG. 2, from its inoperative position shown in FIG. 2 to its operative position shown in FIG. 3. As may be seen from FIG. 3 the end 27 of the lever 21 is still in engagement with the projection 29 of the shutter drive lever means in the position of the parts shown in FIG. 3 where the end 28 of the lever 14 has already reached the underside of the pin 9. If, at this point, the operator should change his mind and decide not to make an exposure and simply release the lever 21 so that it will be returned to its rest position or starting position by the spring 22, then the shutter drive lever means nevertheless would operate against the will of the operator to move the shutter means from its closed to its opened position. Under normal conditions, where the operator does not change his mind about making the exposure the operator will continue to turn the lever 21 in a counter clockwise direction, as viewed in FIG. 3, beyond the position shown in FIG. 3 so that the end 27 of the lever 21 rides off the projection 29 of the lever 18, and then of course the shutter drive means will in fact drive the shutter to open the same in order to make an exposure, and the parts are shown in FIG. 4 where the manually operable lever means 21 has already reached its end position and where the shutter drive means has already driven the shutter and returned to its inoperative position, the shutter means having already returned to its closed position shown in FIG. 4. During such normal operation the operator will simply release the lever 21 so that the spring 22 will return it to the starting position thereof, and during this turning of the lever 21 in a clockwise direction, as viewed in FIG. 4, the end 27 of the lever 21 will simply engage the projection 29 of the lever 18 and turn the lever 18 in opposition to the spring 19 in a counter clockwise direction, as viewed in FIGS. 2–4, around the pin 17 until the end 27 of the lever 21 moves beyond the projection 29 and thereupon the spring 19 will return the lever 18 to its position where the projection 29 engages the lower right projection of the lever 14.

Thus, with this construction as thus far described it is inevitable that if the operator has turned the lever 21 to a point where the shutter drive lever means has reached its operating position but where the lever 21 has not yet reached its end position and the operator should then change his mind about making an exposure, an exposure will nevertheless be made against the will of the operator, and this undesirable result is avoided with the structure of the invention.

In accordance with the present invention there is provided in addition to the structure described above a single simple compact unit forming a holding lever means which will releasably hold the shutter drive means in its operative position until the manually operable lever means 21 has reached its end position, so that if the latter lever means is released before it reaches its end position an exposure will not be made even if the shutter drive means has already reached its operative position. This holding lever means includes the lever 25 which is supported for turning movement by a pivot pin 24 carried by the plate 6, and a spring 26 is coiled about the pivot 24, engages with one leg against the stationary inner tube of the assembly, and engages with its other leg against a projection at the lower left part of the lever 25, as viewed in the drawings, so as to urge this lever 25 to turn in a clockwise direction, as viewed in the drawings. Thus, the entire structure of the unit which is added in accordance with the invention is composed only of the elements 24—26, so that it is clear that this additional unit of the invention is simple and compact and does not require any appreciable amount of additional space and can easily be added to conventional shutter structures.

The spring 26 urges the upper free end of the lever 25 against the projection 32 at the lower left end of lever 14, and it will be noted that the upper right edge portion of the lever 25 is inclined so that during turning of the lever 14 from its inoperative to its operative position the spring 26 will maintain the upper edge portion of the lever 25 in engagement with the projection 32 while the latter rides along the inclined upper right edge portion of the lever 25, as viewed in the drawings. At its uppermost end portion, the lever 25 is formed with a relatively shallow, substantially V-shaped notch 31, and the projection 32 which rides along the upper right edge portion of the lever 25 will enter into the notch 31 when the lever 14 has reached its operative position shown in FIG. 3. The force of the spring 26 is such that if the operator should release the lever 21 when it has reached the position shown in FIG. 3, just before its end position, then the spring 15 will be incapable of turning the lever 14 to drive the shutter. In other words the spring 26 is sufficiently stronger than the spring 15, even when the latter is fully tensioned in the position shown in FIG. 3, to maintain the holding lever 25 in the position shown in FIG. 3 in opposition to the spring 15 and thus prevent the shutter drive means from opening the shutter if the operator should decide to release the lever 21 before it reaches its end position but after the lever 14 has reached its operating position. Thus, with this exceedingly simple construction the structure of the invention will reliably prevent undesired exposures from being made.

Figure 3:
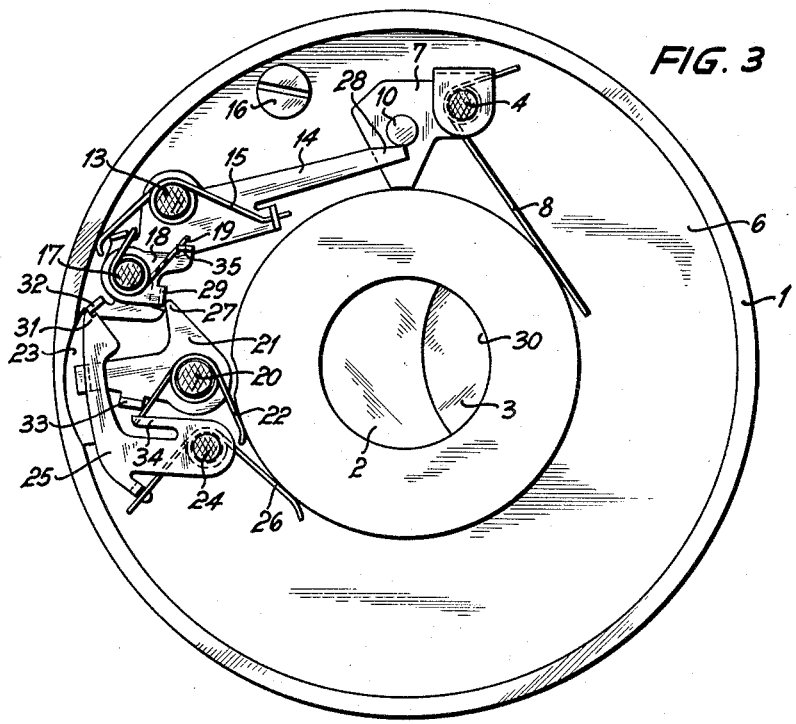
FIG. 3 shows the structure of FIG. 2 after the manually operable means have been moved by the operator from its starting position to a point just before its end position where the shutter drive means is in its operative position ready to drive the shutter but where the manually operable means has not yet reached its end position.
Figure 4:
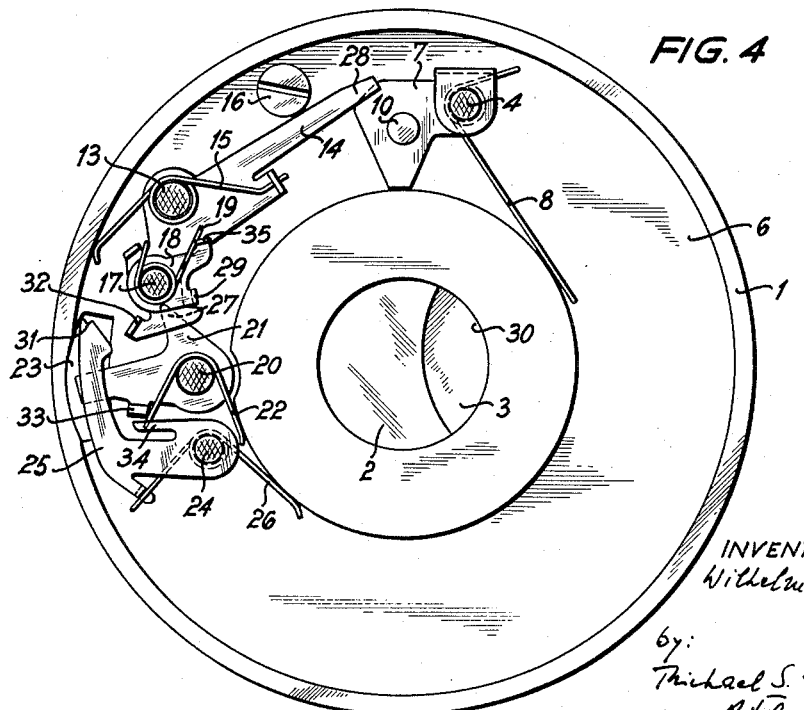
FIG. 4 shows the position which the parts take after the manually operable means has been moved all the way to its end position and the shutter drive means has driven the shutter so as to to make an exposure.

When the operator turns the lever 21 all the way to its end position beyond the point shown in FIG. 3 to the position indicated in FIG. 4, a projection 33 of the lever 21 will engage a projection 34 of the lever 25 to turn this lever 25 in opposition to the spring 26 in a counter clockwise direction, as viewed in the drawings, and this will result in release of the lever 14 so that it can now be turned by the spring 15 and actuate the shutter to make an exposure. Thus, it is the manually operable lever means 21 itself which upon turning beyond the position shown in FIG. 3 to its end position engages and turns the holding lever 25 through the slight distance necessary to release the shutter drive means so that the shutter will be actuated.

It will be noted that the holding means for releasably holding the shutter drive lever means operates, without any awareness on the part of the operator, in a fully automatic manner. If with the structure of the invention the operator should decide, when the parts have reached the position of FIG. 3, not to make an exposure and to release the lever 21, then when the operator subsequently decides to make an exposure the lever 21 will simply turn freely back to the position shown in FIG. 3 and will then move the lever 14 slightly beyond the position shown in FIG. 3 whereupon the tip of the portion 27 of the lever 21 will ride off the projection 29 and the projection 33 will engage the projection 34 so that by the time the lever 21 reaches its end position the holding lever 25 will have been turned through the slight distance required to release the shutter drive means in order to make an exposure.

It will be understood that each of the elements described above or two or more together, may also find a useful application in other types of shutters differing from the types described above.

While the invention has been illustrated and described as embodied in camera shutters, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, shutter means having a normally closed position and being movable from said closed position to an open position for making an exposure; shutter drive means cooperating with said shutter means for moving the same from said closed to said open position thereof, said shutter drive means having an inoperative position where it is incapable of moving said shutter means and being movable from said inoperative position to an operative position where said shutter drive means cooperates with said shutter means to move the latter from said closed to said open position thereof; manually operable means cooperating with said shutter drive means for moving the same from said inoperative to said operative position thereof and for then releasing said shutter drive means to move said shutter means from said closed to said open position thereof, said manually operable means being movable from a given starting position to a predetermined end position where said manually operable means releases shutter drive means, and said shutter drive means reaching said operative position thereof before said manually operable means reaches said end position, and holding means forming a unit separate from said manually operable means and cooperating with said shutter drive means for holding the latter in said operative position thereof, independently of any return movement of said manually operable means toward said starting position thereof, until said manually operable means reaches said end position thereof so that after said manually operable means has moved from said starting position through a distant sufficient to place said shutter drive means in said operative position thereof, said shutter drive means will be prevented by said holding means from moving said shutter means from said closed to said open position thereof even if the operator does not move said manually operable means all the way to said end position thereof, said manually operable means cooperating with said holding means for moving the same to a position releasing said shutter drive means only when said manually operable means has reached said end position thereof.

2. In a camera, in combination, shutter means having a normally closed position and being movable from said closed position to an opening position for making an exposure; shutter drive means cooperating with said shutter means for moving the same from said closed to said open position thereof, said shutter drive means having an inoperative position where it is incapable of moving said shutter means and being movable from said inoperative position to an operative position where said shutter drive means cooperates with said shutter means to move the latter from said closed to said open position thereof; manually operable means cooperating with said shutter drive means for moving the same from said inoperative to said operative position thereof and for then releasing said shutter drive means to move said shutter means from said closed to said open position thereof, said manually operable means being movable from a given starting position to a predetermined end position where said manually operable means releases said shutter drive means, and said shutter drive means reaching said operative position thereof before said manually operable means reaches said end position; and holding means cooperating with said shutter drive means for holding the latter in said operative position thereof, independently of any return movement of said manually operable means toward said starting position thereof, until said manually operable means reaches said end position thereof so that after said manually operable means has moved from said starting position through a distant sufficient to place said shutter drive means in said operative position thereof, said shutter drive means will be prevented by said holding means from moving said shutter means from said closed to said open position thereof even if the operator does not move said manually operable means all the way to said end position thereof, said manually operable means cooperating with said holding means for moving the same to a position releasing said shutter drive means only when said manually operable means has reached said end position thereof.

3. In a camera, in combination, support means; shutter means carried by said support means for movement from a closed position to an open position for making an exposure; shutter drive lever means turnably carried by said support means for turning movement between an inoperative position out of operative engagement with said shutter means and an operative position engaging said shutter means for driving the latter from said closed to said open position thereof; manually operable lever means turnably carried by said support means and turnable by the operator from a given starting position to a given end position, said manually operable lever means, during turning from said start to said end position thereof, engaging said shutter drive lever means for turning the latter from said inoperative to said operative position before said manually operable lever means reaches said end position thereof, whereby before said manually operable lever means has reached said end position thereof said shutter drive means is in said operative position thereof; and holding lever means turnably carried by said support means and engaging said shutter drive lever means when the latter reaches said operative position thereof for holding said shutter drive lever means in said operative position thereof, independently of any return movement of said manually operable lever means toward said starting position thereof before said manually operable lever means has reached said end position thereof, said manually operable lever means cooperating with said holding lever means for moving the same to a position releasing said shutter drive lever means only when said manually operable lever means has reached said end position thereof.

4. In a camera, in combination, support means; shutter means carried by said support means for movement from a closed position to an open position for making an exposure; shutter drive lever means turnably carried by said support means for turning movement between an inoperative position out of operative engagement with said shutter means and an operative position engaging said shutter means for driving the latter from said closed to said open position thereof; manually operable lever means turnably carried by said support means and turnable by the operator from a given starting position to a given end position, said manually operable lever means, during turning from said start to said end position thereof, engaging said shutter drive lever means for turning the latter from said inoperative to said operative position before said manually operable lever means reaches said end position thereof whereby before said manually operable lever means has reached said end position thereof said shutter drive means is in said operative position thereof; and holding lever means turnably carried by said support means and engaging said shutter drive lever means when the latter reaches said operative position thereof for holding said shutter drive lever means in said operative position thereof, independently of any return movement of said manually operable lever means toward said starting position thereof, before said manually operable lever means has reached said end position thereof, said holding lever means having a portion located in the path of movement of said manualy operable lever means and engaged thereby only when the latter has moved beyond the point where said shutter drive lever means has reached said operative position thereof, said manually operable lever means then moving said holding lever means away from said shutter drive lever means to release the latter for driving the shutter from said closed to said open position in order to make an exposure.

5. In a camera, in combination, support means; a shutter drive lever turnably carried by said support means for turning movement between an inoperative position, where said lever is incapable of driving a shutter of the camera, and an operative position, where said lever will drive a shutter of the camera from a closed to an open position in order to make an exposure; spring means operatively connected to said shutter drive lever and becoming tensioned during turning of said lever from said inoperative to said operative position thereof so that said spring means will actuate said lever to drive the camera shutter from said closed to said open position thereof, said shutter drive lever having a projecting portion; a manually operable lever turnably carried by said support means and turnable from a given starting position to a predetermined end position, said manually operable lever engaging said shutter drive lever during turning of said manually operable lever from said starting toward said end position thereof and turning said shutter drive lever from said inoperative to said operative position thereof while tensioning said spring means, said manually operable lever placing said shutter drive lever in said operative position thereof before said manually operable lever reaches said end position thereof; and a holding lever turnably carried by said support means and formed with a notch which receives said projecting portion of said shutter drive lever when the latter has reached said operative position thereof, said holding lever being located in the path along which said projecting portion would move upon driving of said shutter drive lever by said spring means and blocking such movement so that said holding lever retains said shutter drive lever in said operative position thereof independently of any return movement of said manually operable lever toward said starting position before reaching said end position, said manually operable lever upon turning beyond the point where said shutter drive lever has reached said operative position to said end position engaging said holding lever and moving the latter away from said projecting portion of said shutter drive lever so as to release latter to said spring means in order to move the shutter from its closed to its open position to make an exposure.

6. In a camera, in combination, support means; a shutter drive lever turnably carried by said support means for turning movement between an inoperative position, where said lever is incapable of driving a shutter of the camera, and an operative position, where said lever will drive a shutter of the camera from a closed to an open position in order to make an exposure; spring means operatively connected to said shutter drive lever and becoming tensioned during turning of said lever from said inoperative to said operative position thereof so that said spring means will actuate said lever to drive the camera shutter from said closed to said open position thereof, said shutter drive lever having a projecting portion; a manually operable lever turnably carried by said support means and turnable from a given starting position to a predetermined end position, said manually operable lever engaging said shutter drive lever, during turning of said manually operable lever from said starting toward said end position thereof, and turning said shutter drive lever from said inoperative to said operative position thereof while tensioning said spring means, said manually operable lever placing said shutter drive lever in said operative position thereof before said manually operable lever reaches said end position thereof; a holding lever turnably carried by said support means and formed with a notch which receives said projecting portion of said shutter drive lever when the latter has reached said operative position thereof, said holding lever being located in the path along which said projecting portion would move upon driving of said shutter drive lever by said spring means and blocking such movement so that said holding lever retains said shutter drive lever in said operative position thereof independently of any return movement of said manually operable lever toward said starting position before reaching said end position, said manually operable lever upon turning beyond the point where said shutter drive lever has reached said operative position to said end position engaging said holding lever and moving the latter away from said projecting portion of said shutter drive lever so as to release latter to said spring means in order to move the shutter from its closed to its open position to make an exposure; and second spring means acting on said holding lever for urging the latter into engagement with said projecting portion of said shutter drive lever, said projecting portion riding along an edge portion of said holding lever during turning of said shutter drive either from said operative to said inoperative position thereof and entering said notch only upon reaching of said operative position thereof, said second spring means being stronger than said first-mentioned spring means even when the latter is fully tensioned upon location of said shutter drive lever in said operating position thereof.

7. In a camera as recited in claim 6, a third spring means acting on said manually operable lever for urging the same to said rest position thereof.

References Cited in the file of this patent

UNITED STATES PATENTS

| | | |
|---|---|---|
| 2,816,494 | Kaden | Dec. 17, 1957 |
| 2,986,983 | Troeger | June 6, 1961 |